3,312,525
PROCESS FOR SEPARATION OF AMMONIA FROM GAS MIXTURES
Lothar Schmidt and Walter Neugebauer, Constance, Germany, assignors to Deutsche Gold- und Silber-Scheideanstalt vormals Roessler, Frankfurt am Main, Germany
Filed July 1, 1966, Ser. No. 568,711
Claims priority, application Germany, July 11, 1962, D 39,363
4 Claims. (Cl. 23—196)

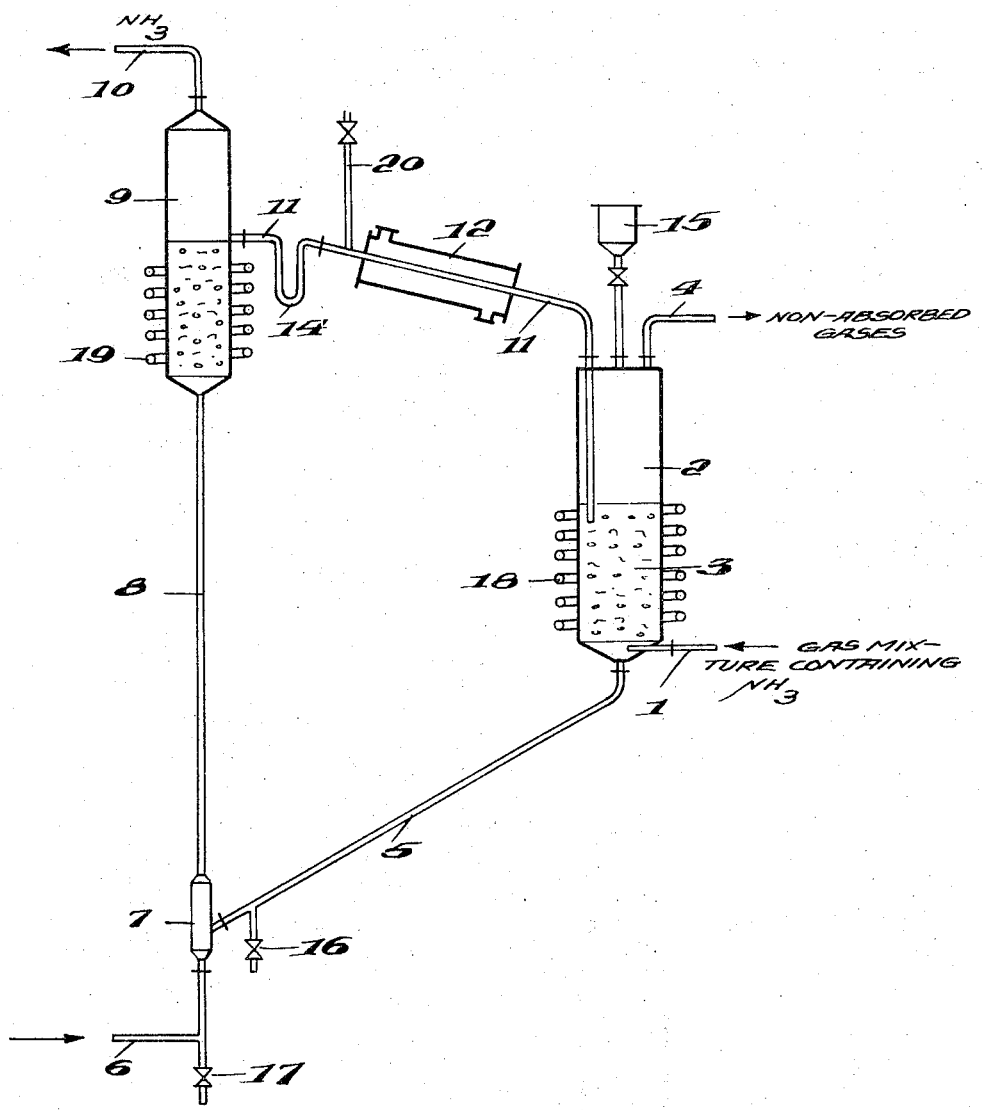

This is a continuation-in-part of application Serial No. 294,311, filed July 11, 1963, now abandoned.

This invention relates to a process for separating and recovering ammonia from gas mixtures, especially gas mixtures containing HCN, by selectively absorbing the ammonia in a melt comprising an alkali metal acid salt of sulfuric acid heated to a temperature at which it is in a free flowing liquid state.

A series of processes are known for the separation of gaseous ammonia from mixtures having different chemical reactivity, especially acidic gases, as, for example, hydrogen cyanide, hydrogen sulfide, sulfur dioxide and carbon dioxide. The object of these processes is the removal or separation of ammonia from the carrier gas mixture and its recovery in pure form.

Thus, for example, sulfuric acid or acid pickling solutions are used for the recovery of ammonia from gases, whereby more or less impure ammonium salt solutions result through neutralization. The workup of these solutions to solid ammonium salts or to ammonia is uneconomical or limited by high costs.

Moreover processes for the separation and recovery of ammonia are known in which the ammonia is selectively absorbed from, for example, hydrocyanic acid containing gases by means of aqueous solutions of acidic absorption agents, as, for example, acid salts of phosphoric acid, lower fatty acids or boric acid complexes with pentaerythritol and then desorbed at suitable temperature and pressure conditions.

Solutions of ammonium nitrate or urea nitrate and nickel, cobalt, zinc or cadmium salts have been proposed for the absorption and desorption of ammonia or solutions of ethanolamines or sodium carbonate have been proposed for the absorption and desorption of carbon dioxide in the separation and recovery of ammonia and carbon dioxide from gas mixtures.

In those processes concerning the recovery of ammonia from mixtures with gases of different reactivity, a more or less greater part of the different components of the gas mixture are also dissolved corresponding to their partial pressure along with the ammonia absorbed in the selective absorption solution. These constituents must be separated by the usual means, as, for example, by stripping, before the recovery of ammonia. The expense of the apparatus is increased and the process accordingly is expensive.

It has been proposed in British Patent 23,889 (1908) to heat ammoniacal solutions or $(NH)_2SO_4$ to drive off ammonia and volatile compounds therefrom, to form $NH_4HSO_4$ and $(NH_4)_2S_2O_7$. When $(NH_4)_2SO_4$ is heated to 350–400° C. to drive off $NH_3$ a molten mixture of $NH_4HSO_4$ and $(NH_4)_2S_2O_7$ is obtained. This molten mixture may be cooled to 200–300° C. and a current of impure $NH_3$ and steam may be passed through the molten mass at 200–300° causing the $NH_3$ to be absorbed and the steam to react with the mixture thereby converting all the acid sulfates and pyrosulfates or a material part thereof into neutral sulfates, while at the same time organic impurities contained in the impure ammonia are decomposed or volatilized. It has also been proposed to heat the resulting neutral sulfates to decompose them into free $NH_3$, $NH_4HSO_4$ and $(NH_4)_2S_2O_7$. This process, however, has been found not to be satisfactory for selectively separating $NH_3$ from gases unless the gases contain a large proportion of $NH_3$. The process is not suitable for separating $NH_3$ from a gas mixture containing a small proportion of $NH_3$. It has also been found that this process is not suitable for selectively separating substantially all of the $NH_3$ from a gas mixture and especially not suitable for selectively separating ammonia in a continuous process because the molten mixture of $NH_4HSO_4$ and $(NH_4)_2S_2O_7$ resulting from heating $(NH_4)_2SO_4$ or a molten mixture resulting from heating a mixture of $(NH_4)_2SO_4$, $K_2SO_4$ and $Na_2SO_4$ to 200–300° C. forms either a non-flowing paste or solidifies rapidly upon passage of a gas mixture containing $NH_3$ into the molten mixture.

It has now been found that ammonia can be separated and advantageously recovered in a chemically and technically simple manner from gas mixtures, especially from gas mixtures containing acidic gases by contacting the gas mixture with an acidic melt for absorption of the ammonia and heating the latter if desired to cause desorption of ammonia. For example, ammonia can be separated and recovered according to the invention from gas mixtures which contain sulfur dioxide, hydrogen sulfide, carbon dioxide and especially hydrogen cyanide. Moreover, the gas mixture can also contain other constituents, for example, hydrogen. The absorption of the ammonia can be effected by introducing the gas mixture into the acidic melt.

The term "acidic melt" as used herein is employed to signify melts of materials which contain an acidic hydrogen atom. The preferred materials are the alkali metal acid salts of sulfuric acid, e.g., potassium hydrogen sulfate and sodium hydrogen sulfate. It is possible and often desirable to employ a mixture of these salts. "Acidic melt" is further intended to signify an alkali metal acid salt of sulfuric acid or mixtures thereof which are in a free flowing liquid state, neither a viscous paste or solid nor an aqueous solution.

It is clear that only such materials can be present in the melt according to the invention which are not affected chemically by the constituents present in the gas mixtures from which ammonia is to be separated.

It is desirable to use materials as constituents of the acidic melt which have melting points as low as possible in order to avoid decomposition of the ammonia or other constituents of the gas mixture as far as possible. The use of low melting materials enhances the technical operation of the process and provides a technical heat advantage.

In order to obtain as low a melting point as possible, materials can be added to the melt which effect a lowering of the melting temperature in ways known per se. This can be effected, for example, by employing a mixture of salts which consists, for example, of sodium hydrogen sulfate and potassium hydrogen sulfate. Thus, for example, a mixture of 56.5 mol percent sodium hydrogen sulfate and 43.5 mol percent potassium hydrogen sulfate melts at the very desirable temperature of 125° C. In general about equal molar proportions of sodium hydrogen sulfate and potassium hydrogen sulfate are suitable. A melt consisting of potassium acid sulfate, sodium acid sulfate, neutral sodium sulfate and neutral potassium sulfate in the following molar ratios:

| Sulfate: | Molar ratio |
|---|---|
| $KHSO_4$ | 10–13 |
| $NaHSO_4$ | 10–13 |
| $K_2SO_4$ | 0.5–1 |
| $Na_2SO_4$ | 0.5–1 | has been found especially suitable for selectively absorbing more than 95% of the ammonia from a coke oven gas containing typically about 1.5 to 2.5% by volume of ammonia, 0.15 to 0.35% HCN and other typical coke oven gas constituents.

The process of the invention more specifically comprises selectively separating ammonia from a gas mixture containing ammonia and hydrocyanic acid, especially a minor proportion of ammonia, by (a) contacting the gas mixture in a first step with melt in a free flowing state comprising a major proportion of sodium bisulfate and potassium bisulfate in about equal molar ratios and a minor proportion of neutral sodium sulfate and neutral potassium sulfate, at a temperature of about 125° C. to about 280° C., for a time sufficient for the melt to absorb about all the ammonia in the gaseous mixture, to produce a melt still in a free flowing state, typically containing finely divided crystals suspended in the melt; (b) in a second step desorbing the ammonia in the resulting melt by heating the resulting melt to a temperature of about 320° C. to about 480° C. and collecting the ammonia produced; and (c) recycling the melt with ammonia removed therefrom.

It has been found that in ammonia absorption-desorption according to the invention the following reversible reaction takes place:

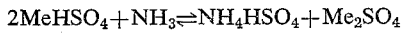
$$2MeHSO_4 + NH_3 \rightleftharpoons NH_4HSO_4 + Me_2SO_4$$

wherein Me is an alkali metal, preferably sodium or potassium. A part of the $Me_2SO_4$ is dissolved in the free flowing molten mass and the remainder is maintained suspended in the form of fine crystals.

Desorption of ammonia is suitably carried out at a temperature of about 320° C. to about 480° C. The temperature at which the desorption will be carried out will naturally be as low as economically suitable in order to release the desired amount of ammonia from the melt. When the desorption is carried out, for example, at a temperature of more than 350° C., a slight decomposition of the ammonia may take place. This, however, as experience has shown, amounts to no more than 5% of the ammonia introduced. Moreover, at higher temperatures a slight thermal decomposition of the hydrogen sulfate constituents of the melt into pyrosulfates and water can take place, especially if the melt has a high sodium content. In the case of slight decomposition it is possible to reestablish the original composition of the melt without difficulty by simple introduction of a corresponding amount of water or steam. If the ammonia containing gas mixture treated already contains water special addition of water or steam, of course, is not necessary. In general, however, it is desirable to avoid decomposition of the sodium hydrogen sulfate, potassium hydrogen sulfate, or other alkali metal hydrogen sulfate present in the melt by maintaining the desorption temperature below that at which any significant decomposition takes place.

By the addition of neutral salts, such as neutral alkali metal sulfates, to the melt the rate of desorption of ammonia can be increased.

Moreover, it is not necessary that the acid melt be present as a homogeneous liquid phase. Within the scope of the present invention it is also possible to use melts in which a part of the salts is present in solid form. This applies equally to the acid salts and the neutral salts added. Likewise, the salt or salts which are formed by the ammonia absorption can also be present entirely or partially in solid form. The solid parts are suspended in the melt so that problems in handling them do not arise.

The speed of desorption of the ammonia is dependent on temperature and can be accelerated by increasing the temperature. It is especially advantageous to carry out the desorption of ammonia by using carrier gases. For example, nitrogen, hydrogen, air or steam can be used as the gas. The desorption of the ammonia can, for example, take place by introducing such a gas into the melt.

A particular advantage of the process of the invention is that the acid components in the gas mixture do not dissolve in the melt. Hereby it is possible to obtain in a single process step both pure ammonia and at the same time the acid components in such pure form that they can be reused.

It is especially advantageous to carry out the process continuously, whereby expediently the acid melt is recycled in an appropriate manner between absorption and desorption steps.

An apparatus suitable for carrying out the process of the invention is set out schematically in the accompanying drawing.

The ammonia containing gas is introduced through inlet 1 into the absorption chamber 2 containing the acid melt 3. The ammonia free gas leaves the absorption chamber through outlet 4. The melt charged with ammonia flows through the outlet 5 into a forwarding means 7 which most preferably consists of an air lift pump. In the case of an air lift pump as shown in the drawing the lifting gas is introduced into the apparatus through inlet 6. The absorption chamber 2 is provided with a heating means 18, such as steam coils. The acid melt is conveyed by way of valve 7 through inlet line 8 into the desorption chamber 9. Desorption chamber 9 is also provided with a heating means 19, typically steam coils. The lifting gas charged with ammonia leaves the desorption chamber through outlet 10.

The melt freed of ammonia flows through outlet line 11 back again into the absorption chamber 2. It is possible to provide line 11 with a heat exchanger 12 which returns the melt to the required absorption temperature. The heat exchanger 12 can comprise an air or water cooler and be used in known ways for preheating the reaction and/or carrier gases or the melt flowing out of the absorption chamber 2.

The line 11 is immersed in the melt 3 to a certain depth to prevent passage of the gases freed of ammonia into the desorption chamber. A syphon 14 can be provided in line 11 for the same purpose. The acid melt can be introduced, for example, by means of addition funnel 15 and be discharged, for example, by means of valves 16 and 17.

Regulation of the height of the acid melt in the absorption chamber 2 during the process is not necessary with the described apparatus since this is provided by the amount of melt present in the system. The desorption chamber 9 can be connected with line 11 by an inlet 20.

It is also obviously possible to provide further heat exchangers for the gases which leave the process.

Another apparatus which is useful for effectively carrying out the process according to the invention is one which provides spray towers or absorption columns with several stages in place of the absorption or desorption chambers.

Instead of an air lift pump, other known means, for example, rotary pumps, can be used for lifting the melt. The use of an air lift pump, however, has an advantage in that the desorption of the ammonia takes place to a great degree in line 8 and thereby the desorption chamber can be smaller in dimensions.

As already pointed out the use of a carrier gas in the desorption phase considerably accelerates the desorption of the ammonia. Although the ammonia separated is obtained in a diluted form, in many cases the accelerated desorption compensates for the disadvantage of dilution.

A further advantage which is combined with carrying out of the process continuously is that it is not necessary to drive off all the absorbed ammonia in the desorption step. As is known from many chemical processes, the achievement of the last few percent of conversion in conversions approaching 100% is very expensive. Also in the present case the ammonia desorption proceeds very quickly at the beginning but then the reduction of ammonia content of the melt becomes slower. On this basis and in order that the dimensions of the desorption chamber not be too large, it is suitable not to drive off all the ammonia, but to allow part to return to the absorption chamber.

The following specific examples illustrate the process of the invention.

EXAMPLE 1

A mixture of potassium hydrogen sulfate, sodium hydrogen sulfate, neutral potassium sulfate and neutral sodium sulfate was introduced into the apparatus as shown in the drawing in a molar ratio of 10:13:0.6:0.7, respectively.

A gas mixture of hydrogen, hydrocyanic acid (HCN) and ammonia in a molar ratio of 10:3:2 was conducted through the absorption chamber at 260° C. until the amount of ammonia carried in the recycled melt no longer changed and an equilibrium was reached.

1.8 normal cubic meters of the above gas mixture was introduced. The ammonia was almost quantitatively absorbed. The exit gas from the absorption chamber contained 0.357 normal cubic meters, or 99.1%, of the hydrocyanic acid introduced. The desorption was carried out with the aid of hydrogen at 340° C. The hydrogen from the desorption chamber contained 0.231 normal cubic meters, or 96.3%, of the ammonia introduced and was free of hydrocyanic acid.

EXAMPLE 2

A gas mixture of nitrogen, hydrocyanic acid and ammonia in the molar ratio of 10:2:1, respectively, was introduced into an apparatus as shown in the drawing at 260 to 280° C. and passed through a molten salt mixture as given in Example 1 until an equilibrium during recycling was attained. Thereafter 2.06 normal cubic meters of such gas mixture was introduced. The exit gas which was freed of ammonia contained 0.315 normal cubic meters, or 99.3%, of the hydrocyanic acid introduced.

Nitrogen at 360° C. was used for the desorption. The nitrogen leaving the desorption chamber contained 0.153 normal cubic meters, or 96.3%, of the ammonia introduced, and was free of hydrocyanic acid.

EXAMPLE 3

A mixture of potassium hydrogen sulfate, sodium hydrogen sulfate, neutral potassium sulfate and neutral sodium sulfate was introduced into an apparatus as in the drawing in the molar ratio of 10:10:1:1, respectively.

A gas mixture of nitrogen, sulfur dioxide and ammonia in the ratio of 4:2:1 was passed through the apparatus at 220 to 240° C. until an equilibrium in the recycling was reached. Thereafter 1.75 normal cubic meters of such gas mixture were introduced. The nitrogen which left the absorption chamber contained 0.486 normal cubic meters, or 97.1%, of the sulfur dioxide, and 0.0005 normal cubic meters, or 0.2%, of the ammonia introduced.

Nitrogen was used at 320° C. for desorption, which upon leaving the desorption chamber contained 0.238 normal cubic meters, or 95.2%, of the ammonia introduced.

EXAMPLE 4

A gas mixture of nitrogen, hydrocyanic acid and ammonia in the ratio of 6:1:1 was passed into an apparatus shown in the drawing through a mixture of potassium hydrogen sulfate and neutral potassium sulfate in the molar ratio of 5:1 at 260° C. until an equilibrium was reached. Thereafter, 2.4 normal cubic meters of such gas mixture were introduced. 0.299 normal cubic meters, or 99.5%, of the starting hydrocyanic acid was contained in the exhaust gas from the absorption chamber.

The nitrogen which was used for separation at 340° C. contained upon leaving the desorption chamber 2.888 normal cubic meters, or 96%, of the ammonia introduced.

In the following Examples 5–8, the apparatus shown in the drawing was changed, in a manner not shown, by positioning the desorption chamber under the absorption chamber to aid flow of the melt. In this variation the melt is fed into the top of the desorption chamber after absorption takes place and pumped from the bottom of the desorption chamber after desorption into the top of the absorption chamber.

EXAMPLE 5

10 normal cubic meters per hour of a gas mixture consisting of nitrogen, hydrocyanic acid and ammonia in the molar ratio 20:4:1, respectively, were introduced into the absorption chamber at a temperature of about 220° C. The gas mixture was passed upward countercurrent to and in direct contact with about 4 liters per hour of a free flowing melt at 220° C. of a mixture of potassium hydrogen sulfate and sodium hydrogen sulfate in about equal molar ratios. More than 99.8% of the ammonia in the gas mixture was absorbed by the melt.

Up to about 99.5% of the hydrocyanic acid in the gas mixture was recovered in the exhaust gas leaving the absorption chamber.

The melt, heated to about 280° C. by the heat of reaction produced by the ammonia absorption, was heated to 360° C. after leaving the absorption column and passed to the upper end of the desorption chamber. The upper half of the desorption chamber was heated to 420° C. The melt was passed through the desorption chamber counter-current to 3.5 normal cubic meters per hour of steam preheated to 250° C. The steam was removed from the upper end of the desorption chamber and condensed in a separate cooler, not shown, to produce a pure aqueous ammonia solution containing about 10.5% ammonia. The melt was removed from the bottom of the desorption chamber containing less than 0.1% of the ammonia present in the melt when it entered the desorption chamber. It was then pumped back into the top of the absorption chamber and the process repeated to produce a continuous process.

EXAMPLE 6

5 normal cubic meters per hour of a gas mixture consisting of nitrogen, hydrocyanic acid and ammonia in the molar ratio of 10:3:2 was fed into the base of the absorption chamber at a temperature of 200° C. and passed countercurrent to and in intimate contact with 6.5 liters per hour of a melt at a temperature of 170° C. in the absorption chamber and containing about 54% NaHSO$_4$ and about 46% KHSO$_4$. More than 99.98% of the ammonia in the gas mixture was absorbed by the melt.

More than 99.5% of the hydrocyanic acid present in the starting gas mixture was recovered in the air removed from the head of the absorption chamber.

The melt was heated to 360° C. after leaving the absorption chamber and fed into the head of the desorption chamber. The desorption chamber was heated to 370° C. and a stream of 5 normal cm.³ per hour of air preheated to the same temperature was fed into the desorption chamber and passed in intimate contact with and countercurrent to the melt. After removal from the desorption column, 0.50 kilogram per hour of ammonia was washed from the air.

The melt, heated to about 370° C. in the desorption chamber, was fed to a cooling and steam-absorption chamber, not shown, in which demineralized water was sprayed into the melt through a nozzle having an opening 0.3 mm. wide at a pressure of 1.5 atmospheres. The amount of water sprayed was sufficient to be completely dissolved in the melt. After the melt was regenerated and at the operating temperature of the absorption stage, it was pumped back into the head of the absorption chamber to produce a continuous process.

EXAMPLE 7

10 normal cubic meters per hour of a gas mixture consisting of air, carbon dioxide and ammonia in the molar ratio of 10:11:1, respectively, were passed into the base of the absorption chamber at a temperature of 250° C. The gas mixture was passed in intimate contact with and countercurrent to 8 liters per hour of a melt at 250° C. consisting of NaHSO$_4$ and KHSO$_4$ in about equal molar ratios. Thereby 99.8% of the ammonia present in the gas mixture was absorbed in the melt and the carbon dioxide in the gas mixture was recovered almost quantitatively in the gas removed from the head of the absorption chamber.

The melt, after removal from the absorption chamber was heated to 380° C. and passed into the head of the desorption chamber. The upper half of the desorption chamber was heated to 450° C. Steam preheated to 250° C. was passed countercurrently through the melt. The steam mixed with the desorbed ammonia was removed from the head of the desorption chamber and condensed in a separate cooling chamber, not shown, to form an aqueous ammonia solution containing 16% ammonia. The melt, which contained about 0.1% of the ammonia present in the starting gas mixture, was pumped back into the head of the absorption column for absorption of ammonia again.

EXAMPLE 8

8 normal cubic meters per hour of a gas mixture consisting of air, carbon dioxide, and ammonia in the molar ratio of 10:1:1, respectively, was passed into the absorption chamber at a temperature at 180° C. countercurrent to and in intimate contact with a melt heated to 180° C. and consisting of 54% NaHSO$_4$ and 46% KHSO$_4$. 99.9% of the ammonia present in the gas mixture was thereby absorbed in the melt. The carbon dioxide in the starting gas was recovered almost quantitatively in the gas removed from the head of the absorption column.

The melt, after removal from the absorption column, was heated to 380° C. and introduced into the head of the desorption chamber. The upper half of the desorption chamber was heated to 420° C. The melt was passed down through the desorption chamber countercurrent to and in contact with steam preheated to 250° C. to take up the desorbed ammonia. The mixture of steam and ammonia was removed from the head of the desorption chamber and condensed to form an aqueous ammonia solution containing 12% ammonia. The melt, which contained about 0.1% ammonia, was then pumped back into the head of the absorption chamber to produce a continuous process.

EXAMPLE 9

The following comparative test was carried out to demonstrate that a process employing a salt mixture of ammonium sulfate ((NH$_4$)$_2$SO$_4$), neutral sodium sulfate and neutral potassium sulfate cannot be used for selectively absorbing at least about 95% of the ammonia in a gas mixture containing a minor proportion of ammonia.

A mixture consisting of ammonium sulfate ((NH$_4$)$_2$SO$_4$)

neutral potassium sulfate and neutral sodium sulfate in the molar ratio of 2:1:1, respectively, was heated to 380° C. to release ammonia. The ammonia release was slow. The ammonia release increased through gradual sintering of the salt mixture up to a point where the mixture melted and then dropped. About 80% of the theoretical amount was released. The resulting melt was cooled to 280° C. and a gas mixture containing 10 vol. percent ammonia, 45 vol. percent H$_2$O and 45 vol. percent N$_2$ was mixed into the melt. A part of the steam fed into the melt converted pyrosulfate constituents in the melt back to hydrogen sulfates. When about 50% of the theoretical ammonia amount (100% = (NH$_4$)$_2$SO$_4$) was taken up in the melt (about 6% by weight), the melt became very viscous and formed a non-free flowing paste. Passing ammonia into this resulting paste became very difficult and when 60-70% of the theoretical ammonia amount was absorbed the paste solidified making further absorption economically unfeasible.

The ammonia partial pressure over the paste composition was about 7 torr at 280° C. This is very important if substantially all the ammonia in a gas mixture containing a low concentration of ammonia is to be removed from the gas mixture because in treating a gas mixture which has an ammonia partial pressure of 7 torr (equal to about 1% by volume ammonia) no ammonia can be absorbed. When a gas mixture containing about 5% by volume was treated about 18% of the ammonia was not absorbed.

When the paste was heated after the ammonia absorption step from 280° C. to 380° C., ammonia was given off and the paste gradually formed a liquid. As soon as the ammonia content of the melt reached 20% of the original content, the rate of ammonia desorption dropped to a point which made the time required for further desorption unsuitable.

Relative to the reversible ammonia absorption and ammonia desorption by the melt, the process taught by British Patent No. 23,889 (1908) practically only can be exploited in an amount which is only 30% of the figures given in that patent, provided that a high ammonia concentration is present in the starting gas mixture. If a gas mixture is used which contains 2 vol. percent ammonia, only 50% of the ammonia is separated, whereas more than 95% of the ammonia is separated and recovered employing the process of the invention.

We claim:
1. In a process for selectively separating ammonia from a gas mixture containing a minor proportion of ammonia and hydrocyanic acid, the steps comprising
    (a) in a first stage contacting the gas mixture with a melt consisting of a major proportion of a component selected from the group consisting of sodium hydrogen sulfate and potassium hydrogen sulfate and a minor proportion of a component selected from the group consisting of neutral sodium sulfate, neutral potassium sulfate, and mixtures thereof at a temperature of about 125° C. to about 280° C. to produce a melt in a free flowing state containing about all the ammonia in the gas mixture, and thereafter,
    (b) in a second stage desorbing the ammonia from the resulting melt by heating the resulting melt to a temperature of about 320° C. to about 480° C.,
    (c) collecting desorbed ammonia and recycling the melt back to the first step.
2. A process as in claim 1 comprising in said first stage contacting the gas mixture with a melt consisting of potassium hydrogen sulfate, sodium hydrogen sulfate, neutral potassium sulfate and neutral sodium sulfate in the molar ratios respectively of about 10–13, 10–13, 0.5–1 and 0.5–1 at a temperature of about 220° to about 280° C.
3. A process as in claim 1 comprising in said first stage contacting the gas mixture with a melt consisting of potassium hydrogen sulfate and neutral potassium sulfate in the molar ratio respectively of about 5:1.
4. A process as in claim 1 wherein a carrier gas is passed through the melt during said desorbing.

References Cited by the Examiner
UNITED STATES PATENTS

| 1,366,303 | 1/1921 | Vis | 23—196 |
|---|---|---|---|
| 2,797,148 | 6/1957 | Carlson | 23—196 |

FOREIGN PATENTS 23,889  11/1909  Great Britain.

REUBEN FRIEDMAN, *Primary Examiner.*

C. HART, *Assistant Examiner.*